United States Patent [19]
Yliniemi

(10) Patent No.: US 7,792,659 B2
(45) Date of Patent: Sep. 7, 2010

(54) DEVICE AND A METHOD FOR MEASUREMENT OF ENERGY FOR HEATING TAP WATER SEPARATED FROM THE BUILDINGS HEATING ENERGY-USAGE

(75) Inventor: Kimmo Yliniemi, Lulea (SE)

(73) Assignee: Kyab Lulea AB, Lulea (SE)

( * ) Notice: Subject to any disclaimer, the term of this patent is extended or adjusted under 35 U.S.C. 154(b) by 309 days.

(21) Appl. No.: 12/089,826

(22) PCT Filed: Nov. 2, 2006

(86) PCT No.: PCT/SE2006/001250

§ 371 (c)(1),
(2), (4) Date: Apr. 10, 2008

(87) PCT Pub. No.: WO2007/053091

PCT Pub. Date: May 10, 2007

(65) Prior Publication Data

US 2008/0281763 A1    Nov. 13, 2008

(30) Foreign Application Priority Data

Nov. 2, 2005    (SE) .................................... 0502416

(51) Int. Cl.
*G01K 17/06* (2006.01)
*G01F 1/00* (2006.01)
*G06F 19/00* (2006.01)
*G06F 17/40* (2006.01)

(52) U.S. Cl. .................. 702/182; 73/861; 137/551; 137/560; 222/23; 340/603; 374/30; 374/31; 374/40; 702/127; 702/187; 702/189

(58) Field of Classification Search .............. 73/113.01, 73/204.11, 204.12, 861; 137/1, 551, 560; 222/23; 340/500, 540, 584, 603, 679; 374/29, 374/30, 31, 32, 39, 40, 41, 43, 44; 702/1, 702/127, 130, 136, 182, 187, 189; 705/400, 705/412, 413
See application file for complete search history.

(56) References Cited

U.S. PATENT DOCUMENTS

| 3,464,268 | A | * | 9/1969 | Wesp | 374/40 |
| 3,516,487 | A | * | 6/1970 | Keiser | 165/104.13 |
| 4,157,034 | A | * | 6/1979 | Buchele | 374/41 |
| 4,224,825 | A | * | 9/1980 | Feller | 374/41 |
| 4,482,006 | A | * | 11/1984 | Anderson | 165/11.1 |
| 6,476,592 | B1 | * | 11/2002 | Humlum | 324/74 |

FOREIGN PATENT DOCUMENTS

| DE | 2504797 | * | 8/1975 |
| DE | 3533160 | A1 * | 3/1986 |
| DE | 19749623 | A1 * | 5/1998 |
| EP | 1284394 | A2 * | 2/2003 |

* cited by examiner

*Primary Examiner*—Edward R Cosimano
(74) *Attorney, Agent, or Firm*—Fasth Law Offices; Rolf Fasth

(57) ABSTRACT

A device, such as a heat meter for measurements of hot tap water energy usage, separated from building heating energy usage, in a district heating substation. The device is connected only to sensors attached to the supply pipe and return pipe of the district heating substation. A device, such as a heat meter, has a detector to detect a deviation in the total power (P) usage in the district heating substation which deviation depends on the use of warm tap water.

9 Claims, 3 Drawing Sheets

DEVICE AND A METHOD FOR MEASUREMENT OF ENERGY FOR HEATING TAP WATER SEPARATED FROM THE BUILDINGS HEATING ENERGY-USAGE

PRIOR APPLICATION

This application is a U.S. national phase application based on International Application No. PCT/SE2007/001250, filed 2 Nov. 2006, claiming priority from Swedish Patent Application No. 0502416-1, filed 2 Nov. 2005.

TECHNICAL FIELD

The invention relates to methods, heat meters and systems for measuring energy consumption in district heating substations.

BACKGROUND ART

District heating is generally regarded as an environment friendly method of heat production and distribution. Heat is usually produced at a combined heat and power plant or a heat plant and then distributed in distribution networks using pipes to houses, industries, commercial buildings, apartment buildings etc.

The total amount energy delivered to a building is measured for billing purposes by the supplier of district heating using a heat meter. Heat meters can also be installed and used for energy measurement in heating systems similar to district heating substations. Heat energy meters or heat meters can generally be divided into two types. Flow rate dependent energy meters and constant sampling frequency meters. It is known how to measure and calculate total energy usage and the total power usage (P), in a heating system such as a district heating substation using different types of heat meters, where the heat meter uses the measurements from the temperature sensors and the flow meter, to calculate and integrate the total energy usage and total power usage (P).

Conventional heat meters do not measure how much of the total energy has been used for heating the building or how much of the energy has been used for heating tap water.

To give building owners and others an increased possibility to study and change the energy consumption behaviour, separate measurement of hot water energy consumption and energy usage for building heating is needed. Studies show that separate measurement of hot water usage make people change their behaviour and save energy. The experience in Denmark is that for blocks of flats that had only one meter per building, the installment of individual meters for every apartment resulted in reduced energy consumption.

An example of a previous known district heating substation is given in DE 3,533,160, which relates to a control arrangement for a central consumer unit connected to a district heating system, with a flow measuring device, temperature transmitters for measuring the supply temperature ($T_s$) and return temperature ($T_r$). And further an integrating device for calculating and integrating consumed thermal energy as well as a variable, flow-regulating valve for regulating the flow of district heating water through the central consumer unit.

In the majority of commercial arrangements it is the owner of the building who owns the district heating substation and the supplier of district heating who owns the heat meter. The heat meter owned by district heating suppliers are usually only used for billing purposes.

In order to separately measure energy usage for tap water heating and building heating using known heat meter technology, two heat meters would be needed complete with flow meters and temperature sensors. One of several ways to accomplish this with conventional heat meters would be to use one heat meter for measuring energy usage for building heating and one for measuring energy usage for tap water heating and then adding the measurements together in order to get the total energy used etc. Additional measuring devices, heat meter and their installment is costly. Because of this separate measurement as described above is not practical using conventional heat meters.

SUMMARY OF THE INVENTION

An object of the invention is to provide a device to a low cost, such as a heat meter, for measurement of hot tap water energy usage separate from building heating energy usage, in a heating system such as a district heating substation.

The measurements that separate energy measurement depends on, are the measurements from sensors attached to device, a flow meter attached at the supply pipe or return pipe, a temperature measurement device attached at the supply pipe, and a temperature measurement device attached at the return pipe of a heating system such as a district heating substation. The device, such as a heat meter, comprises a detection means to detect a deviation in the total power (P) related to hot water power usage, which detection means use the measurements from sensors at the supply and return pipe of the heating system such as a district heating substation, a calculation means to calculate energy usage and power usage in the heat exchanger which relate to hot water usage. The device comprises means to measure supply ($T_s$) and return temperature ($T_r$), and a flow meter for measurement of the flow of district heating water through the substation.

The detection means detects the start and stop of an deviation in the total power (P), related to hot tap water usage, using measurements from sensors attached to the device, using the measurements of total power (P), comparing the difference between measurements of total power usage (P) against thresholds to detect deviation start and deviation stop, a filtering function may also be used to improve detection, an alternative way of detection is to monitor when power usage is higher than maximum output of the heat exchanger for building heating.

The calculation means calculate the energy usage and power usage in the heat exchanger related to hot water usage and the energy usage and power usage in the heat exchanger related to energy usage for building heating. The calculations are based on the measurements from the attached sensors and the separation of power usage for tap water heating.

The device comprises means to calculate energy consumption in the second heat exchanger, which relates to the deviation, and means to calculate energy usage in the first heat exchanger.

Another object of the invention is to provide a method for providing measurements of hot tap water energy usage separated from building heating energy usage in a district heating substation, which method depends only on sensors attached to supply and return pipes connected to a heating system such as a district heating substation.

This object is achieved by means of a method detecting a deviation in the total power (P), related to the use of warm tap water in the district heating substation, where the only measurements the detection depends on are the measurements from a flow measurement a device attached at the supply or return pipe, a temperature sensor attached at the supply pipe, a temperature sensor attached at the return pipe. The method involves calculation of the energy consumption in the second heat exchanger, which relates to the deviation caused by hot tap water usage.

The invention enables separate measurement of energy usage for building heating and heating tap water in a heating system such as a district heating substation.

In a further aspect of the invention, the method provides an estimate of volume of used heated tap water.

BRIEF DESCRIPTION OF THE DRAWINGS

The present invention will be described in more detail in connection with the enclosed schematic drawings.

DETAILED DESCRIPTION OF THE INVENTION

Separate measurement of tap water energy usage.

the total heat energy consumed, in the district heating substation 1, between t=0 and t is given by the integral:

$$Q = \int_0^t \dot{m} c_p (T_S - T_R) dt = \int_0^t V c_p \rho (T_S - T_R) dt$$

$$V = \frac{\dot{m}}{\rho} \text{ Volume flow rate}$$

$V$: Volume flow rate m³/s $T_S$: Supply temperature ° C.

$T_R$: Return temperature ° C.

$k_1$: Heat coefficient $c_p \rho$ kJ/m³° C.

Heat energy meters are generally divided into two categories, flow rate dependent energy meters (traditional), and constant sampling frequency energy meters. The flow dependent energy meter measures the temperatures and calculates the energy usage after a certain amount of water has passed, constant sampling frequency energy meters calculate energy usage, measure flow (V) and temperatures at constant intervals. The quality of energy measurements depends on the quality of the sensor measurements, and the time between measurements.

It is known how to calculate the total energy usage in a district heating substation, it is also known how to calculate the total power usage (P) in a district heating substation based on the measurements of temperatures and flow (V) through the district heating substation using a flow rate dependent or constant sampling frequency heat energy meter.

Figure 1:
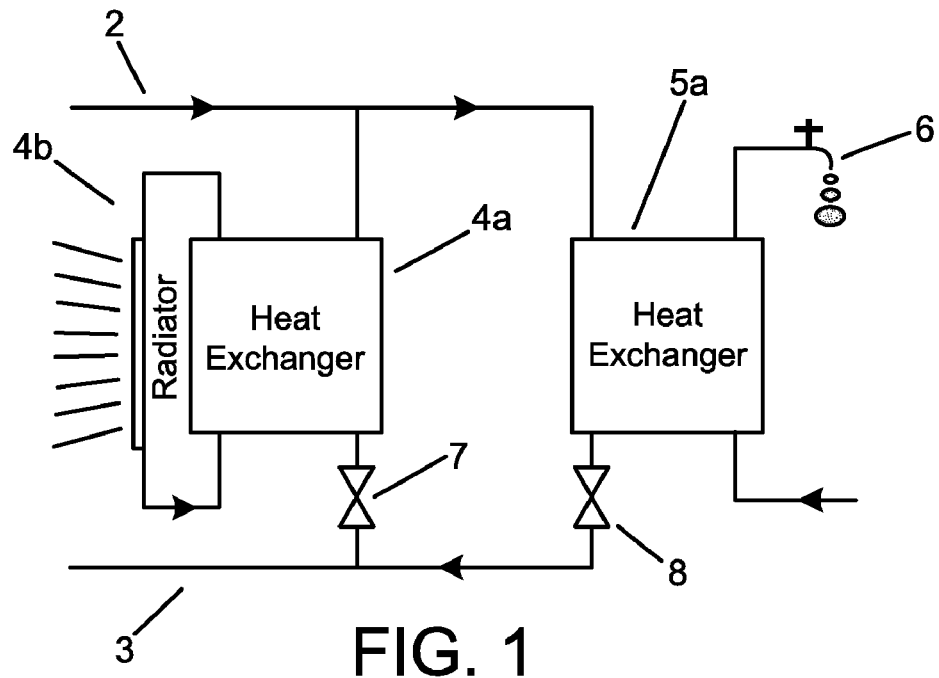
FIG. 1 shows an overview of a district heating substation.
Figure 2:
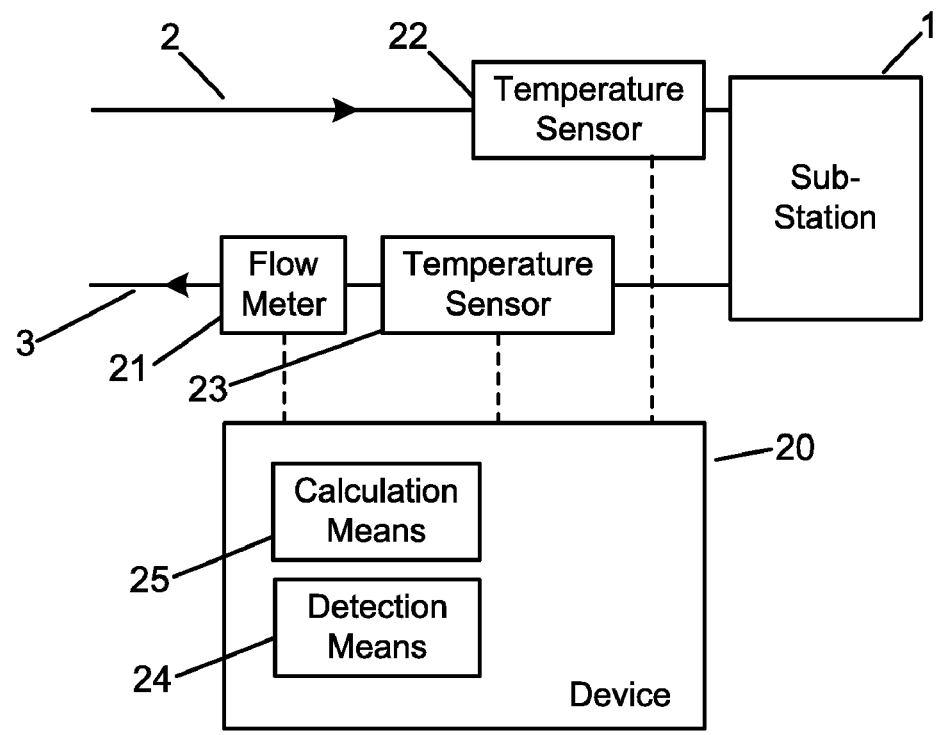
FIG. 2 shows a more detailed overview of a heat meter and connected temperature sensors.

If it's a flow rate dependent energy meter the interval between measurements varies. For both the flow rate dependent and the constant sampling frequency energy meter, the temperatures and flow may be assumed to be constant between measurements, or the integral may be improved using a formula for approximation of the behavior of the measured variable, between measurements. FIG. 2 shows an overview of a district heating substation 1. The device (20), such as a heat meter, comprises an arithmetic device which may be of an analogue or digital type. Such a device comprises the detection means (24) and the calculation means (25). Such a device, may comprise a CPU or similar. It is an advantage if the detection means (24) and the calculation means (25) at least to some extent are implemented as software. Further, such a device may perform integration. The device (20) comprises communication means to communicate with two temperature sensors (22), (23) and a flow meter (21). Both the temperature sensors (22), (23) and the flow meter (21) are located on the primary side. The first temperature sensor (22) is attached at the supply pipe (2), the second temperature sensor (23) is attached to the return pipe (3). The sensors (22), (23) may measure the temperature direct or indirect. The temperature sensors may be of a soft sensor type. I.e. the temperatures may be calculated by observing other measurements. The flow meter (21), measuring supplied district heating water, may be attached to either of supply or return pipe. The district heating substation in FIG. 1 has a first heat exchanger (4a) that is co-current and a second heat exchanger (5a) that is counter-current. There may be several additional heat exchangers in a district heating substation. The first (4a) and second (5a) heat exchanger may be arranged in a common enclosure. However, the heat exchangers (4a), (5a) may be co-current or counter current in any combination. The temperature sensor (22) arranged at the supply pipe and (23) arranged at the return pipe may have a sensing unit mounted inside the pipe. As an alternative it a sensing unit may be mounted on the outside of the pipe. The flow meter (21) may be of several different types. The district heating substation may comprise one or several pumps. Heat exchanger may be parallel or of other configuration.

Previous known heat meters and methods for energy measurement, given the above set of temperature sensors and flow meter, only measures the total energy consumption. The tap water circuit is a faster process than the building heating. Energy consumption for tap water in the building varies more rapidly than building heating. Thus the radiator circuit (4b) is a fairly slow process in comparison with the tap water circuit (6). The heat exchanger (5a) for heating hot water needs to be able to produce hot water on demand if no accumulator is used. The fact that the power consumption for building heating is fairly slow varying, and the power consumption for tap water heating varies more rapidly and has greater magnitude, has enabled the inventor to separate the two from each other.

Figure 4:
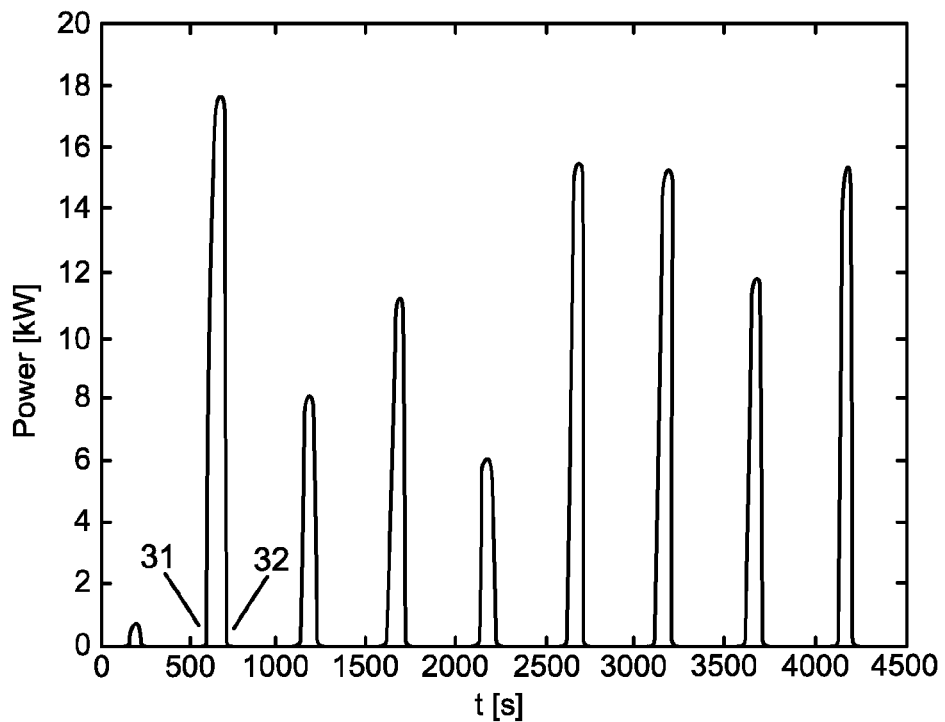
FIG. 4 is an example of a trend curve where power consumption (Ptap) for heating tap water is shown during the same time period as is shown in FIGS. 3 and 5.
Figure 5:
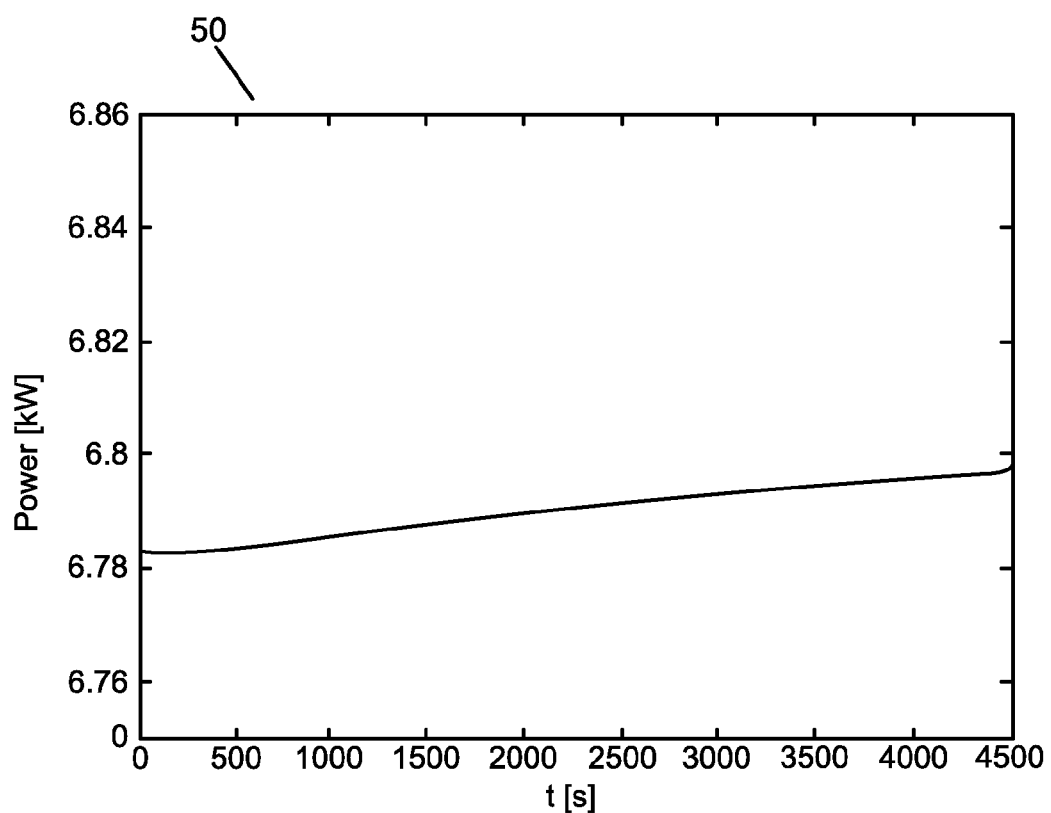
FIG. 5 is an example of a trend curve where power consumption for building heating (Pheat) is shown during the same time period as is shown in FIGS. 3 and 4.

FIG. 4 is an example of a trend curve where power consumption for heating tap water is shown. FIG. 5 shows an example of a trend curve of total power used for building heating and heating tap water during the same time period as is shown in FIG. 4. The scenario in FIGS. 4 and 5 is the same. The scenario comprises a building with radiators (4b) and a complete district heat substation with two heat exchangers (4a), (5a) with separate controllers. The set point for hot tap water is 50° C., and the cold water temperature is 10° C. The outside temperature is −15° C. and the room temperature in the building is set to be 20° C. The how water tapings are random in amplitude and occur every 500 second.

In order to separate power used for building heating and heating tap water, one need to be able to detect when a tapping starts (31) and stops (32). If such detections are performed one can get an accurate estimate of the tap energy usage and building heating energy usage. One approach to get such information is to monitor a valve (8) that controls the tap water heat exchanger (5a) or a valve (7) that controls the building heating heat exchanger (4a). However, many types of valves are self controlling and are due to that difficult to monitor without additional sensors.

Figure 3:
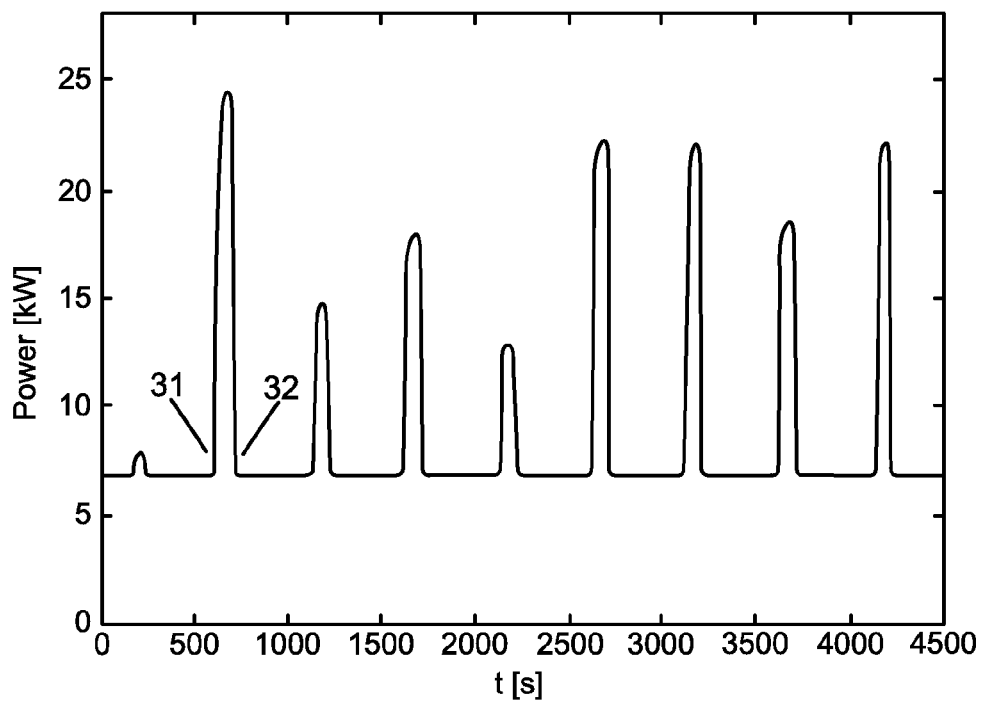
FIG. 3 shows an example of a trend curve of total power (P) used for building heating and heating tap water during the same time period as is shown in FIGS. 4 and 5.

A method according to the invention enables to separate hot water heat energy usage and building heating energy usage. The suggested method of doing this gives a small error, in total energy usage, and according to simulations, only a fraction of this in the estimates, which mainly is related to the device. In the graphs presented in FIG. 3 the energy usage for hot water production was 2.04 kWh and the error in estimation was −0.0016 kWh. The energy usage for heating was 8.49 kWh and the error was 0.0016 kWh. Nine tapings are done in this energy measurement, shown in FIG. 3, in a district heating substation 1. In average every tapping used a little more than 0.2 kWh worth of energy. The duration of the experiment was 4500 seconds or about 1.25 h. Heating used in average about 6.78 kW per hour for the duration of the experiment.

Below is one embodiment of the method to detect a tap of hot water when the valves are self regulating:

Detect tapping, start (31) and stop (32), by monitoring C.

When power usage increases, the value of C is positive, when the power usage decreases value of C becomes negative.

$$P(t+1)-P(t)=C$$

This is the difference between two measurements of the measured total power (P). If the value C is greater than a certain threshold B a tapping is said to start (31). If the value C is below a certain threshold A it is said to stop (32). If the value of C is between threshold A and threshold B the Power is only used for heating, unless a tapping start has been detected then it is used for building heating and tap water heating. The tapping is going on during deviation start (31), and between (31) and (32) until the time after deviation stop (32) has been detected and the value of C has returned to a value between threshold A and threshold B. The thresholds for C is determined by the dynamic properties of the district heating substation (1) and varies depending the how great the derivate (of measured power) is when a tapping starts (31) and stops (32). Basically one can say that the derivate is close to 0 for deviations caused by building heating and the derivate is substantial when tap water heating starts and stops. Choosing a small value for the thresholds gives a good separation, but too small values will class everything as a tapping. A filter function may also be used improve detection, to filter away noise, and filter the slow varying building heating power usage from the total power usage in order to detect a tapping after a number of measurements. In addition to current values, the calculation means can also use historical measurements to calculate energy and power consumption during a deviation related to hot water tapping. As an alternative a tapping can be detected by monitoring when the total power usage becomes larger than what can possibly be produced by the heat exchanger (4a) for building heating.

$$\|P(t+1)-P(t)\|=C$$

Total power consumption $P(t)=Ptap(t)+Pheat(t)$, where $P(t)$ or $P(n)$ may be measured by the device (20) and then integrated to get Q(t). Ptap(t) being the power used for heating tap water (6), Pheat(t) being the power used for building heating. For a normal building one can assume that the hot water usage is not constant. In reality tapings are performed randomly (with respect to start, duration and flow). Assuming that building heating usage is constant for the duration of a tapping unless the tapping is extremely long, then it can be necessary to estimate the power usage for building heating using linearization between the power usage at (31) and (32).

Total power consumption is $P(t)=Ptap(t)+Pheat(t)$, assuming $P(t)$ is equal to Pheat(t) when no tapping occurs gives that if no tapping is detected then Ptap(t)=0 and Pheat(t)=P(t). P(t) being the total power usage at time t, Ptap(t) being the power usage for heating tap water at time t, Pheat(t) being the power usage for building heating at time t.

A 10 second long tapping would yield $$P(0)=Pheat(0)$$

At t=0 there is no tapping, tapping starts at t=0+

$$P(1)=Pheat(0)+Ptap(1)$$

$$P(2)=Pheat(0)+Ptap(2)$$

...

$$P(10)=Pheat(0)+Ptap(10)$$

Assuming that Pheat(t) remains constant for 0<t<10 (the duration of the tapping). This gives that Ptap(1)=P(1)−Pheat(0) and so on. P(t) is measured by the systems heat energy meter. Tapping stop detected at t=10 s, at time t=11 P(11) =Pheat(11), P(11) only consists of Pheat. If P(11) is larger or smaller than P(0) the approximation of power usage (Pheat) and energy usage can be improved using a linearization of the power usage for building heating between the points P(0) and P(11).

Estimating Hot Tap Water Usage.

A basic principle for the estimation is that the heat exchanger (5a) for heating tap water (6) is assumed to be a near lossless device. Each Watt supplied to it is assumed to be used for heating hot water. To heat a certain volume of water to a certain temperature, the heater uses a certain amount of energy. By measuring the energy, the cold-water temperature and hot-water temperature, one gets a reliable estimate of the volume heated water. In such an approach there is a need of temperature measurements of tap water before (9) and after (10) passing through the tap water heat exchanger (5a). If such an arrangement is unavailable, and one do not measure the hot water temperature and the cold water temperature, one may instead assume that the hot water temperature and cold water temperature are fixed, at certain values. By assuming that the energy delivered to the second heat exchanger (5a) is used to heat the water we get the following equations.

$$\dot{Q}_h = P_{tap}$$

$$\dot{Q}_h = \dot{m}_h k_h (T_{hs}-T_{hr})$$

$$\dot{Q}_c = \dot{m}_c k_c (T_{cs}-T_{cs})$$

Setting $\dot{Q}_h = \dot{Q}_c$ gives the ability to estimate the flow of hot water $\dot{m}$.

$$\Delta T_c = T_{cs} - T_{cr}$$

$$\dot{m}_c = \frac{\dot{Q}_h}{k\Delta T_c} = \dot{m}$$

$\dot{m}$=massflow kg/s $T_{Sh}$=temperature supply on the (hot) primary side $T_{Rh}$=temperature return on the (hot) primary side $T_{Sc}$=Temperature supply on the (cold) secondary side $T_{Rc}$=temperature return on the (cold) secondary side $\dot{Q}_h$ being the heat power delivered by the district heating water to the heat exchanger. $\dot{Q}_c$ being the power used to heat the tap water (6). $\dot{m}_c$ being the mass flow of tap water through the heat exchanger $$\left(V_c = \frac{\dot{m}_c}{\rho}\right).$$

k heat transfer coefficient depends on the properties of the heat exchanger (5a) and the specific heat of water. Time delays in heat transfer are discarded.

$\dot{Q}_h$ the power used by the heat exchanger (5a) for heating tap water and can be estimated as described earlier, in the section on separated energy measurement, based on that Ptap=P−Pheat etc, alternatively $\dot{Q}_h$ is measured using a second heat meter. After obtaining $\dot{Q}_h$, one use $$\dot{m}_c = \frac{\dot{Q}_h}{k\Delta T_c} = \dot{m}$$

to estimate the flow.

Assuming a loss less energy transfer, the flow is overestimated. Due to losses, the amount of tap water heated is less than estimated. This can be adjusted using the coefficient k. The coefficient k can change over time, resulting in increased inaccuracy in the estimate, the change can be caused by for instance fouling in the heat exchanger (5a).

It should be understood that this description is exemplifications of the invention and it should not limit the scope of the invention or its underlying idea.

While the present invention has been described in accordance with preferred compositions and embodiments, it is to be understood that certain substitutions and alterations may be made thereto without departing from the spirit and scope of the following claims.

I claim:

1. A device for measurement of energy consumption for heating tap water in a district heating substation, the device comprising:
    first means for measuring a first temperature (Ts) in a supply pipe,
    second means for measuring a second temperature (Tr) in a return pipe,
    means for measuring a total flow (V) of supplied district heating water to the district heating substation by means of a flow meter arranged at the supply pipe or the return pipe, means to calculate the total power (P) delivered to the district heating substation based on the measurement of a first temperature (Ts), the second temperature (Tr) and the total flow (V), a first heat exchanger for household heating, a second heat exchanger for heating tap water, the device comprises a detection means for detecting start, stop and duration of a deviation in the power usage of the district heating substation related to hot water usage, a calculation means, to calculate the energy consumption in the second heat exchanger, which relates to the deviation, the calculation means approximates the power (Pheat) usage in the first heat exchanger during the detected hot water tapping and calculates the power usage (Ptap) in the second heat exchanger for heating tap water, during the identified deviation as a difference between a total power (P) and an approximated power usage for building heating (Pheat) during a duration of a detected tapping.

2. A device according to claim 1 wherein the calculation means in the device use measurements from the first means, the second means and the flow meter, and no other measurements in order to calculate energy consumption in the second heat exchanger.

3. A device according to claim 2 wherein the detection means detect start and stop of a tapping by detecting deviations in total power usage related to hot water usage.

4. A device according to claim 3 wherein the device is a physically separate unit in relation to the district heating substation.

5. A device according to claim 1 wherein the calculation means calculate the energy consumption of the first heat exchanger.

6. A method for measurement of energy consumption for heating tap water in a district heating substation, the district heating substation comprises a first heat exchanger for building heating and a second heat exchanger for heating of tap water the method comprising:
    measuring a first temperature (Ts) in a supply pipe by means of a first means arranged at the supply pipe, measuring a second temperature (Tr) in a return pipe by means of a second means arranged at the return pipe, measuring a total flow (V) of supplied district heating water to the district heating substation by means of a flow meter arranged at the supply pipe or the return pipe, calculation of the total power usage in the district heating substation based on the measurements of the first temperature (Ts) the second temperature (Tr) and the total flow (V), characterized by the detection of start, stop and duration of a deviation in the power usage of the district heating substation where the deviation is a result of hot water usage, calculation of the energy consumption in the second heat exchanger, which relates to the deviation, based on the above mentioned measurements and by approximating the power (Pheat) usage in the first heat exchanger during the detected deviation, and by calculating the power usage (Ptap) in the second heat exchanger as a difference between a total power (P) and an approximated power usage for building heating (Pheat) during a duration of a detected tapping.

7. A method according to claim 6 the calculation means in the device uses measurements from the first means, the second means and the flow meter, and no other measurements are used in order to calculate energy consumption in the second heat exchanger.

8. A method according to claim 7 wherein the calculating means, detects that start and stop of a tapping by detecting deviations in total power usage (P) related to hot water usage.

9. A method according to claim 6 wherein the calculation of the energy usage in the first heat exchanger.

* * * * *